United States Patent [19]
Evoy

[11] Patent Number: 5,937,193
[45] Date of Patent: Aug. 10, 1999

[54] CIRCUIT ARRANGEMENT FOR TRANSLATING PLATFORM-INDEPENDENT INSTRUCTIONS FOR EXECUTION ON A HARDWARE PLATFORM AND METHOD THEREOF

[75] Inventor: David Ross Evoy, Tempe, Ariz.

[73] Assignee: VLSI Technology, Inc., San Jose, Calif.

[21] Appl. No.: 08/757,430

[22] Filed: Nov. 27, 1996

[51] Int. Cl.[6] .................................................. G06F 9/45
[52] U.S. Cl. ........................................................ 395/705
[58] Field of Search ...................... 364/DIG. 1 MS File, 364/DIG. 2 MS File; 395/704, 705

[56] References Cited

U.S. PATENT DOCUMENTS

| 4,873,628 | 10/1989 | Omori ..................................... | 395/705 |
| 5,692,047 | 11/1997 | McManis ................................ | 395/704 |
| 5,740,441 | 4/1998 | Yellin et al. ............................ | 395/704 |

OTHER PUBLICATIONS

Andrew S. Tanenbaum, "Structured Computer Organization" (1984) pp. 10–12, 1984.
*The ARM6 Family Bus Interface,* Advanced RISC Machines Ltd. (1996).
*The ARM Microprocessor Architecture,* Advanced RISC Machines Ltd. (1996).
Wayner, "Sun Gambles On Java Chips", Byte, Nov. 1996.
*Java Virtual Machine Architecture,* Sun Microsystems (1996).

*Primary Examiner*—Robert B. Harrell
*Attorney, Agent, or Firm*—Wood, Herron & Evans, L.L.P.

[57] ABSTRACT

A translating circuit coupled to a processor and memory of a computer system translates platform-independent instructions such as Java bytecodes into corresponding native instructions for execution by the processor. In one embodiment, the translating circuit is incorporated into the same integrated circuit device as the processor. In another embodiment, the translating circuit is provided within one or more external integrated circuit devices. One or more look-up tables map platform-independent instructions into one or more native instructions for the processor, thereby minimizing software-based interpretation of platform-independent program code. Moreover, platform-independent instructions are mapped to native instructions on-the-fly, or alternatively, in blocks prior to execution using a state machine.

29 Claims, 5 Drawing Sheets

CIRCUIT ARRANGEMENT FOR TRANSLATING PLATFORM-INDEPENDENT INSTRUCTIONS FOR EXECUTION ON A HARDWARE PLATFORM AND METHOD THEREOF

FIELD OF THE INVENTION

The present invention relates to computer and data processing arrangements. More particularly, the invention relates to accelerating the execution of program code on such arrangements.

BACKGROUND OF THE INVENTION

Platform-independent programming languages, such as the "Java" programming language from Sun Microsystems, Inc. offer significant advantages over traditional, platform-specific languages. A platform-independent programming language typically utilizes platform-independent program code (machine-readable instructions) suitable for execution on multiple hardware platforms without regard for the particular instruction set for the hardware platforms. A hardware platform typically includes a computer system having one or more processors (e.g., microprocessors or microcontrollers) which execute a particular set of instructions having a specific format, sometimes referred to as a native instruction set. This is in contrast to platform-specific languages, which utilize platform-specific compilers to generate program code that is native to one particular hardware platform. While the same source code may in some instances be compiled by different platform-specific compilers into suitable program code for multiple platforms, the resulting program code is not platform-independent.

In many environments, platform-independent program codes are in an intermediate code format, since further processing is required to execute such codes on a specific hardware platform. For Java, for example, the intermediate codes are referred to as bytecodes. Typically, a compiler is used to generate a series of intermediate codes from a source file. The intermediate codes are then executed by a software interpreter which converts them into native instructions for the computer system on the fly. Consequently, the intermediate codes are executable on any computer system having a suitable platform-independent program code interpreter.

Many platform-independent program codes are typically relatively compact, which makes them readily suited for downloading over a network or modem. Moreover, since the program code is platform-independent, the downloading computer system (or server) can download the same program code irrespective of the particular hardware platform of the executing computer system (or client). Consequently, platform-independent program codes such as Java are expected to enjoy immense popularity for the distribution of software programs over the Internet. Typically, platform-independent software programs downloaded from the Internet are in the form of applets which execute within a web browser. It should be understood, however, that platform-independent program codes have many other uses, including in stand-alone applications, operating systems, and real-time embedded systems, among others.

One problem with platform-independent program code, however, is that the program code must be interpreted during run time, which significantly reduces execution speed compared to program code native to a particular hardware platform. Some Java interpreters, for example, may require up to 50 processor clock cycles to process each bytecode, compared to typically one clock cycle for most native instructions.

As an alternative to run time interpretation, software-based just-in-time (JIT) compilers have been developed to optimize interpretation of platform-independent program code, typically by emulating the functionality of the platform-independent code using native code. While execution speed is increased over simple runtime interpretation, the platform-independent program code is still slower than native code, and additional memory space is required to store the compiler code.

At the other extreme, dedicated processors (e.g., for Java, the picoJAVA, microJAVA and UltraJAVA processors from Sun Microelectronics) have been proposed to utilize platform-independent instructions as their native instruction set. While these processors have the capability of running platform-independent program code as fast as other native program codes for other hardware platforms, the processors suffer from the same problems as any other processor when executing non-native program code.

It is estimated that in the future as much as 50% or more of the program code run on any particular hardware platform may be platform-independent. However, a large portion of program code will still be platform specific. Consequently, a substantial need exists for a manner of accelerating the execution of platform-independent program code on a hardware platform without adversely impacting the execution speed of native program code thereon.

SUMMARY OF THE INVENTION

In accordance with one aspect of the invention, there is provided a computer system for executing program code in a format having platform-independent instructions. The computer system includes a processor for executing program code in a format having native instructions; a memory coupled to the processor for storing program code for execution by the processor; and a translation circuit coupled to the memory, the translation circuit configured and arranged to receive a platform-independent instruction from the memory and output at least one native instruction for the processor corresponding thereto.

In accordance with another aspect of the invention, there is provided a translation circuit for use in a computer system to execute program code in a format having platform-independent instructions on a processor in the computer system that executes program code in a format having native instructions. The translation circuit includes an input circuit configured and arranged to receive a platform-independent instruction; and translating means, coupled to the input circuit, for outputting at least one native instruction for the processor corresponding the platform-independent instruction.

According to a further aspect of the invention, there is provided a method of executing program code in a format having platform-independent instructions on a processor which executes program code in a format having native instructions. The method includes receiving a platform-independent instruction; and translating the platform independent instruction with a hardware-implemented translation circuit into at least one corresponding native instruction using an object table including a plurality of entries, each entry matching a platform-independent instruction with at least one native instruction for the processor.

The above summary of the present invention is not intended to describe each illustrated embodiment, or every implementation, of the present invention. This is the purpose of the figures and the detailed description which follow.

BRIEF DESCRIPTION OF THE DRAWING

Other aspects and advantages of the invention will become apparent upon reading the following detailed description and upon reference to the drawings in which:

FIG. 5 is a functional block diagram illustrating the dataflow between registers and system memory for the translation circuit of FIG. 3.

Figure 1:
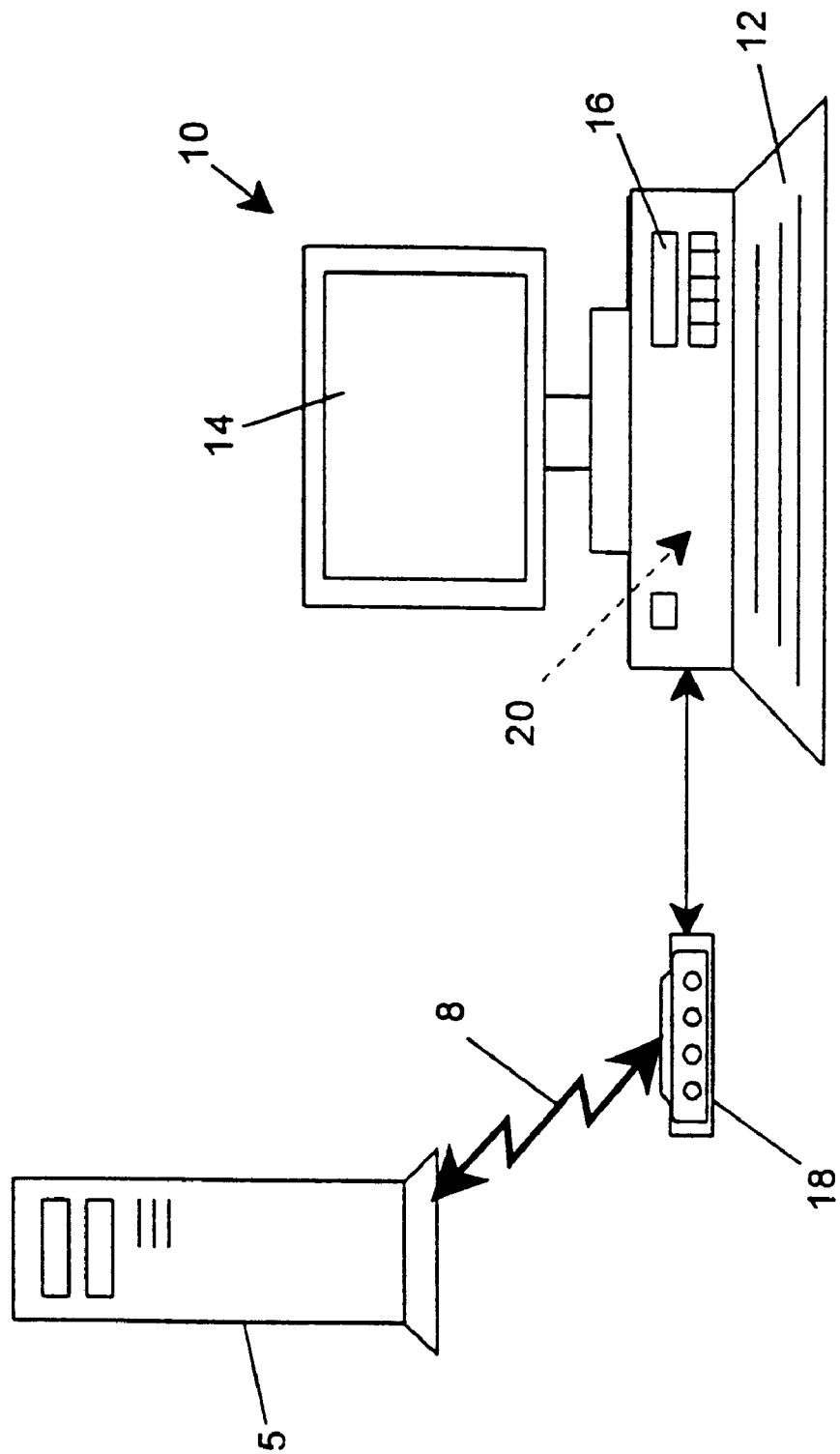
FIG. 1 is a functional diagram of a computer system consistent with the principles of the present invention, and shown coupled to an external server over a network.

While the invention is susceptible to various modifications and alternative forms, specifics thereof have been shown by way of example in the drawings and will be described in detail. It should be understood, however, that the intention is not to limit the invention to the particular embodiment described. On the contrary, the intention is to cover all modifications, equivalents, and alternatives falling within the spirit and scope of the invention as defined by the appended claims.

DESCRIPTION OF THE DISCLOSED EMBODIMENTS

Turning to the drawings, FIG. 1 illustrates a computer system 10 consistent with the principles of the present invention. Computer system 10 is in one embodiment a desktop computer (e.g., based upon a Macintosh or Intel x86 platform) or UNIX workstation having a user input device 18 such as a keyboard and/or mouse, video display or monitor 14, and mass storage 16. Computer system 10 as shown also includes a communications interface such as modem 18 or a network connector for coupling to one or more servers such as server 5 over a network 8. Network 8 may be, for example, a private LAN or WAN, a bulletin board system, or a public network such as the Internet.

It is typically over network 8 that computer system 10 is likely to receive platform-independent program code, since often the servers coupled to computer system 10 over network 8 are unaware of the particular hardware platform of the system, and since it is often desirable for the servers to only have to download one version of program code for a given application. However, it should be appreciated that platform-independent program code may be received from computer system 10 by any number of alternate manners, including removable storage devices such as floppy disks, CD-ROM's, magnetic tape, and flash memories, etc. Moreover, platform-independent program code may be initially stored in computer system 10, e.g., in ROM's and other non-volatile devices, on hard drives, etc. It should also be appreciated that the platform-independent program code executed by computer system 10 may include any type of computer program, including stand-alone applications, operating systems, embedded applications, etc., as well as applets which are executed within a web browser.

Computer system 10 is implemented in other embodiments as a network computer (NC) which has little or no mass storage and which principally executes applications downloaded from server 5. With a network computer, a substantial portion of the program code executed by the computer is typically platform-independent. Thus, that this type of application particularly benefits from the performance enhancements offered by the various embodiments of the present invention.

Computer system 10 may also be any of a number of other computer or data processing systems in which platform-independent program code may be utilized, including various network servers, minicomputers, mainframe computers, workstations, desktop computers, laptop computers, mobile computers, embedded controllers, etc.

Certain embodiments of the invention generally operate by converting platform-independent instructions to be executed by a processor into corresponding native instructions for the processor using a hardware-implemented translation circuit. As will be discussed below, the translation occurs immediately prior to execution by the processor, whereby the translation circuit outputs directly to the processor. In the alternative, the translation circuit outputs to a memory for storing the native instructions. The instructions are then pulled from the memory and executed by the processor (either immediately or at a later instance).

In addition, many of the embodiments of the invention are specifically directed to processing Java bytecodes. However, it should be appreciated that other embodiments may process other platform-independent instruction sets now or hereafter developed consistent with the present invention.

Figure 2:
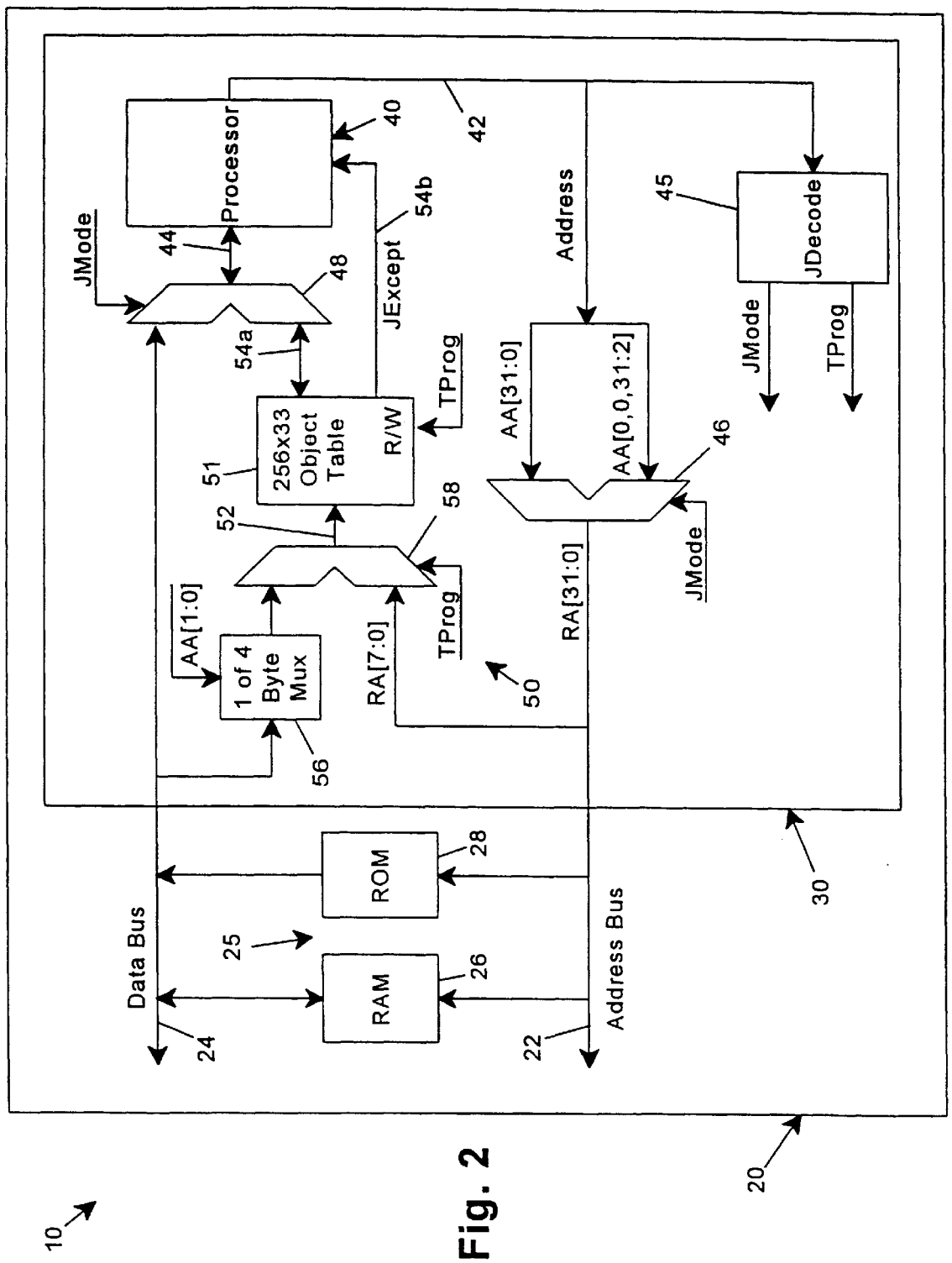
FIG. 2 is a functional block diagram of the circuit board in the computer system of FIG. 1.

FIG. 2 illustrates a specific embodiment of computer system 10 in greater detail. In this embodiment, a look-up table is utilized to directly map platform-independent instructions to corresponding native instructions.

As shown in FIG. 2, computer system 10 includes a circuit board 20 upon which is disposed a microprocessor integrated circuit 30 coupled to a system memory 25 (including RAM 26 and ROM 28) through a system address bus 22 and a system data bus 24 (e.g., a 32-bit address bus and 32-bit data bus, although the width of each bus will vary with the particular application). Address bus 22 may also include a byte enable decoder to enable selection of individual bytes stored in the system memory.

Microprocessor circuit 30 includes a processor, or processing unit, 40 having a native instruction set, and with address lines 42 and data lines 44 providing external connections thereto. Circuit board 20 in specific embodiments of the invention is a motherboard, or alternatively an expansion board or the like.

In one embodiment, processor 40 is an Advanced RISC Machine (ARM) processor developed by Advanced RISC Machines, Ltd., which is a store and forward architecture utilizing 32-bit native instructions. Other processors, including other RISC and CISC processors, may be used in other embodiments. Moreover, multiple processors executing a common instruction set may also be utilized, albeit in separate integrated circuit packages.

Processor 40 is configured to operate in one of two modes. A first, native mode is the normal operating mode of the processor, whereby 32-bit native instructions are pulled from system memory 25 and executed directly by the processor. In a second, platform-independent (Java) mode, consistent in operation with a Java-type program code, a translation circuit 50 coupled to system data bus 24 is utilized to receive 8-bit Java bytecodes and output corresponding 32-bit native instructions directly to processor 40 for execution thereon.

The native and platform-independent modes are selected by processor 40 via a JMode mode select signal. In one specific embodiment, the mode select signal is output from a decoder 45 (JDecode) coupled to the address lines 42 of processor 40, such that the platform-independent mode is selected whenever an address within a specified range is placed on address lines 42. This in effect partitions the system memory into native and platform-independent partitions. Other manners of switching modes may also be used, e.g., using a special instruction or IO operation to switch from native to platform-independent mode, and an exception or special instruction to switch back to native mode. In addition, mode switching in some embodiments is selectively disabled (e.g., through user input via the keyboard or other user input device) to disable the translation circuit.

Translation circuit 50 generally includes a byte select multiplexer 56, a table program multiplexer 58, and an object table 51. Byte select multiplexer 56 in one embodiment is an 8-bit wide 4-to-1 multiplexer having 32 input lines and 8 output lines. The input lines of byte select multiplexer 56 are coupled to data bus 24 such that selected bytes (groups of 8 bits) are output from multiplexer 56 in response to a byte select signal (discussed in greater detail below). The selected bytes are normally passed through table program multiplexer 58 to input lines 52 of object table 51. In another operational mode, table program multiplexer 58 enables processor 40 to program table 51, in a manner that will be discussed below.

Input lines 52, byte select multiplexer 56 and table program multiplexer 58 together form an input circuit for the translation circuit through which platform-independent instructions are received. The input circuit optionally includes a register or other storage device for storing the platform-independent instruction prior to processing. Moreover, either of the multiplexers may be omitted from the input circuit, e.g., if the platform-independent instructions are the same width as the data bus, or if the table is implemented in non-volatile memory and is not programmable by processor 40. Thus, the input circuit in some embodiments includes only a set of input lines (e.g., address, data or control lines), or a port, depending on the application. Other modifications to the input circuit are possible.

Object table 51 forms a translating means for translation circuit 50 and is implemented in one embodiment as a 256×33 bit RAM having eight input lines 52 (which in this embodiment are address lines) and thirty three output (data) lines 54a and 54b, resulting in 256 possible entries of 33 bits each. Input lines 52 are normally coupled to the output lines of multiplexer 56, while 32 of the data lines (lines 54a) are output to one input of a 32-bit wide 2-to-1 data bus multiplexer 48. The other input of multiplexer 48 is coupled to the system data bus 24, while the output is coupled to data lines 44 of processor 40. One of the two inputs to multiplexer 48 is coupled to processor 40 in response to the JMode mode select signal. Consequently, in native mode, the processor is directly coupled to the system data bus, and in platform-independent mode, the processor is coupled to the system data bus through translation circuit 50.

Each platform-independent instruction is matched with an entry in object table 51 by using the bytecode for the instruction as the index to the table. Each entry therefore includes a 32-bit native instruction that corresponds to the platform-independent instruction which addresses the entry.

In this illustrated example, a 33rd bit is also included in each entry. This bit is set whenever no native instruction exists that can be directly mapped to the addressing bytecode. A thirty third data line 54b (designated JExcept) coupled to the 33rd bit of a selected entry is output from object table 51 to operate as an exception signal to processor 40. The exception signal is provided as a data signal, or as an interrupt signal, to allow the processor to return to native mode and interpret the unmapped bytecode via a software interpreter.

In an alternative embodiment, each entry may only be 32 bits wide, with no dedicated exception line provided to the processor, such that object table 51 is implemented as a 256×32 bit RAM. Unmappable bytecodes in this alternative embodiment are mapped to a specific native instruction that is recognizable by the processor as the exception signal, thereby permitting the processor to interpret the unmapped bytecodes while running in native mode.

Object table 51 may be implemented in other devices in the alternative, such as a ROM, EPROM, flash memory, or other non-volatile memory storage device. Table 51 may also be implemented using a PLA or other dedicated mapping logic. Moreover, the width of the object table may be expanded to greater than 33 bits to assist in assembling data such as immediate data that is embedded in a bytecode stream.

The address lines 42 of processor 40 are coupled to the system address bus 22 through an address bus multiplexer 46 which is controlled via the JMode mode select signal. In the native mode, address lines 42 are coupled directly to the system address bus 22. However, in platform-independent mode, the low two order address lines AA[1:0] are coupled to byte select multiplexer 56 and operate as the byte select signal, and the remaining address lines AA[31:2] are coupled to system address bus lines RA[29:0], with the two high order system address bus lines RA[31:30] coupled to logic zero. This permits the address of the processor to increment by 4 for every 32-bit operation while only incrementing the address of system memory 25 by 1, thereby permitting four bytecodes to be stored in 32-bit words in system memory 25.

Because object table 51 is implemented as a volatile RAM, processor 40 is used to program the table upon startup. In one specific embodiment, programming of the table is permitted by table program multiplexer 58 which, in response to a program mode select signal TProg, couples the low eight order address bus lines RA[7:0] to input lines 52 of table 51. The program mode select signal is also generated by decoder 45, such that a specific address partition is dedicated to the object table. The program mode select signal is also provided to object table 51 at its read/write input.

With this configuration, a copy of the contents of object table 51 are maintained in the system memory, e.g., in a dedicated non-volatile area in ROM 28. The contents may also be stored at various times in RAM 26, or on an external storage device, for example. Processor 40 then is able to copy the contents of the table from the ROM, RAM or external device to the object table by alternating read and write operations. Any write operation to the address partition allocated to the object table is decoded by decoder 45 to assert the program mode select signal, thereby coupling input lines 52 of table 51 to system address bus 22 and placing table 51 into a write mode. With the data lines 54a of table 51 coupled to system data bus 24, processor 40 is then able to write appropriate information to the table.

Other manners of programming object table 51 may be used in the alternative. Moreover, it should be appreciated that if table 51 is implemented as a non-volatile device, no programming of the table is required.

In operation, processor normally runs in native mode, with the mode select signal not asserted, such that address and data lines 42, 44 thereof are coupled directly to the system address and data buses 22, 24 through multiplexers 46, 48. Consequently, processor 40 has direct access to system memory 25 from which to receive native instructions.

However, when processor 40 requests instructions from a platform-independent partition of the system memory, the mode select signal is asserted by decoder 45, which couples the low two order address lines AA[1:0] of address lines 42 to byte select multiplexer 56, couples address lines AA[0, 0,31:2] to system address bus lines RA[31:0] and couples data lines 44 to data lines 54a of object table 51.

In this mode, a memory access to system memory 25 places four 8-bit bytecodes on the data bus, with one of the bytecodes supplied to input lines 52 of object table 51 through byte select multiplexer 56. Then, if a corresponding native instruction to the selected bytecode exists, table 51 outputs it over data lines 54a and directly to processor 40. If no corresponding native instruction exists, table 51 outputs an exception signal, which notifies processor 40 that software interpretation of the bytecode may be required.

After execution of a native instruction when in the platform-independent mode, processor 40 increments its address counter to the next instruction, which has the effect of selecting the next bytecode provided to byte select multiplexer 56 over system data bus 24. It should be noted that, in this arrangement, the address accessed in system memory 25 increments by one for every four increments of the address counter in processor 40 to reflect the presence of four bytecodes in each 32-bit word stored in the platform-independent partition in the system memory.

Return from platform-independent mode to native mode occurs whenever processor 40 accesses the native partition of system memory 25. Consequently, switching between modes may be performed automatically and without dedicated processing by processor 40.

It should be appreciated that the particular design of translation circuit 50 may vary significantly depending upon factors such as the width of the platform-independent instructions, the width of the native instructions, and the mapping required between the two. For example, if the platform-independent and native instructions are the same width, no separate byte select multiplexer is required.

In the specific case of executing Java bytecodes on an ARM processor, it has been found that the significant differences in architecture between the ARM processor and the Java Virtual Machine (the simulated platform upon which Java executes) prevent many Java bytecodes from being directly mapped to native instructions on the ARM. In particular, the ARM processor is a store-and-forward RISC architecture, while the Java Virtual Machine is a stack-based architecture that is more similar in design to other CISC architectures such as the Intel x86 and Motorola 680x0 microprocessors.

It is believed that a greater number of Java bytecodes could be mapped directly for execution on the aforementioned CISC processors, and thus the direct mapping technique disclosed herein may provide comparatively greater performance enhancements. However, it should also be noted that a platform-independent instruction set could be developed based upon a store-and-forward virtual machine architecture, thereby making the direct mapping technique exceptionally suitable for accelerating the operation of an ARM processor or similar device executing such program code.

Other mapping techniques may be utilized to map a greater percentage of platform-independent instructions to native instructions and thereby accelerate performance and minimize exceptions.

For example, the table width and depth are expanded in some embodiments to allow multiple 32-bit native instructions to be generated from a single bytecode. In one embodiment, the table is implemented with multiple entries for each possible bytecode. A single bit in each entry (e.g., bit 34) is used to indicate that an additional native instruction is required to execute the bytecode. The processor then is able to access the next entry mapped to the bytecode, enabling any number of native instructions to be executed for a given bytecode. In this embodiment, the low order input lines of the object table are controlled by the processor to select between the multiple entries. For example, with four entries per bytecode, the two low order input lines would be controlled by the processor. Implementing the table in a RAM would quadruple the size of the RAM, however, it should be appreciated that a custom designed ROM could be developed in a manner known in the art to omit any unused entries.

As another example, a two level or double look-up technique is used to further increase the percentage of mappable platform-independent instructions. In one embodiment, a first, or vector, table maps platform-independent instructions to a vector, or an address, in a second, or object, table storing anywhere from 0 to n native instructions for each bytecode. The first table is implemented in a small RAM (e.g., a 200×8 bit RAM, since there are approximately 200 valid Java bytecodes), with the second table implemented in a 256×34 bit RAM. The address in the first table points to the starting address in the second table for a sequence of native instructions, essentially providing a microcoded routine of native instructions for implementing a bytecode. Again, a separate bit (e.g., bit 34) is used to indicate that at least one more native instruction must be executed after a given table entry is processed. Also, exception conditions are designated by a separate bit (e.g., bit 33). Any of the above alternatives, such as utilizing a dedicated native instruction to signal an exception, may also be used.

Figure 3:
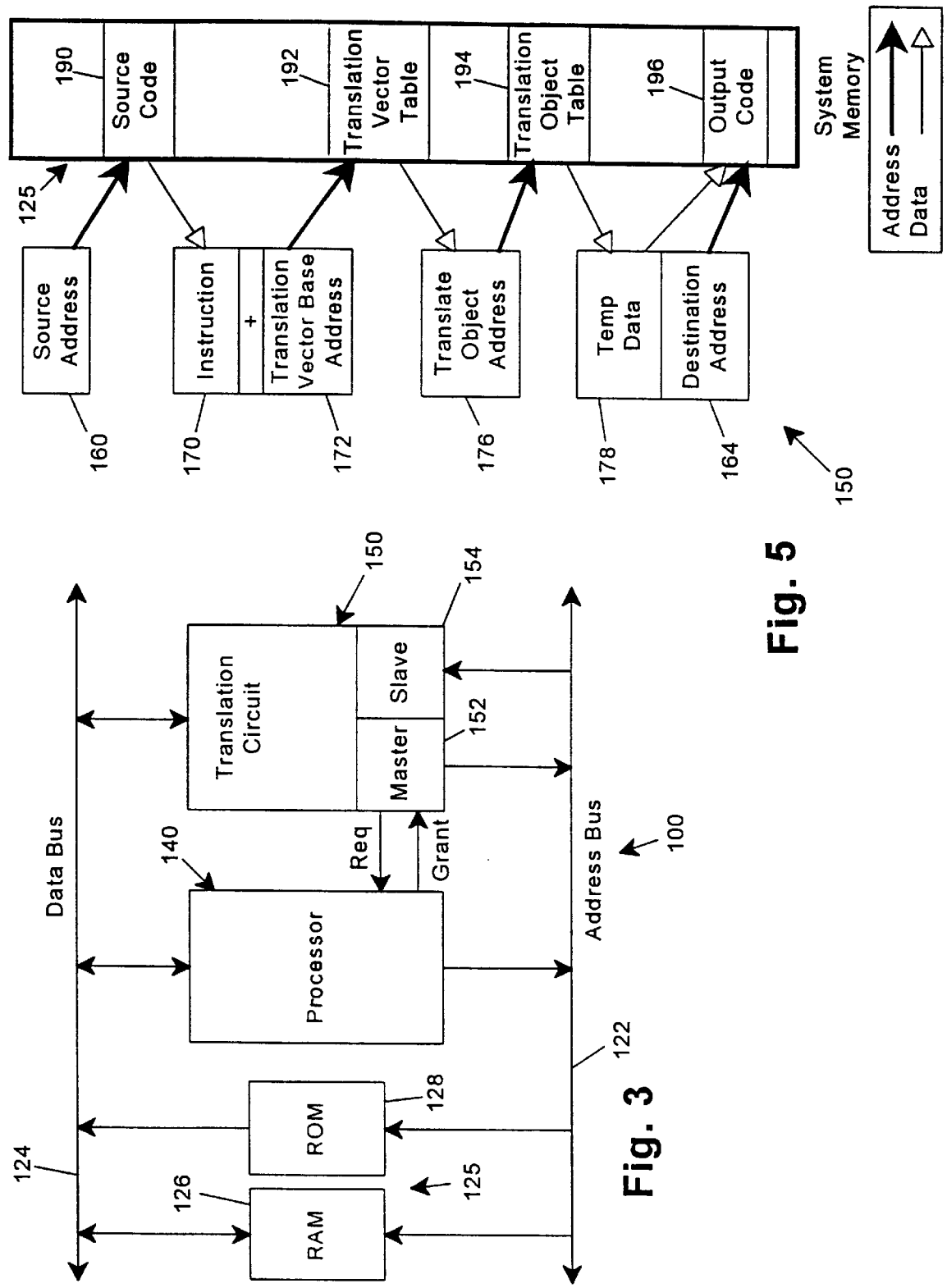
FIG. 3 is a functional block diagram of another computer system consistent with the present invention.

Another computer system 100 consistent with the invention is illustrated in FIG. 3, including a microprocessor circuit 140 (e.g., an ARM processor) coupled to a system memory 125 (including RAM 126 and ROM 128) over an address bus 122 and data bus 124. A translation circuit 150, having a master interface 152 and slave interface 154, is also coupled to address bus 122 and data bus 124. Master interface 152 permits translation circuit 150 to operate as a bus master to translate platform-independent program code stored in memory 125 into corresponding native program code and store the native code back into memory 125. Master interface 152 requests control of the bus from processor 140 through a REQ line, and obtains control when processor 140 asserts a GRANT line. Slave interface 154 is used by processor 140 to program initial memory addresses used by the translation circuit for the code translation.

Master interface 152 in this embodiment operates as a block processing means which permits fill blocks of platform-independent program code to be translated and stored back into memory 125, rather than being supplied directly to the processor. It should be appreciated that other block processing mechanisms which essentially automate the passage of multiple platform-independent instructions through the translating means may be used in the alternative.

Translation circuit 150 as shown in FIG. 3 is implemented as an external device to microprocessor circuit 140. However, it should be appreciated that the translation circuit may also be internal to the microprocessor as with translation circuit 50 above.

Translation circuit 150 primarily operates as a two level look-up table, utilizing a first, vector table, and a second, object table. The first table essentially provides a starting address (vector) in the second table for a microcoded routine of one or more native instructions that correspond to a given platform-independent instruction. However, in this embodiment, the tables themselves are stored in system memory 125, whereby the translating means for the translation circuit essentially includes registers which point to vectors or entries in the tables, rather than the actual tables.

Figure 4:
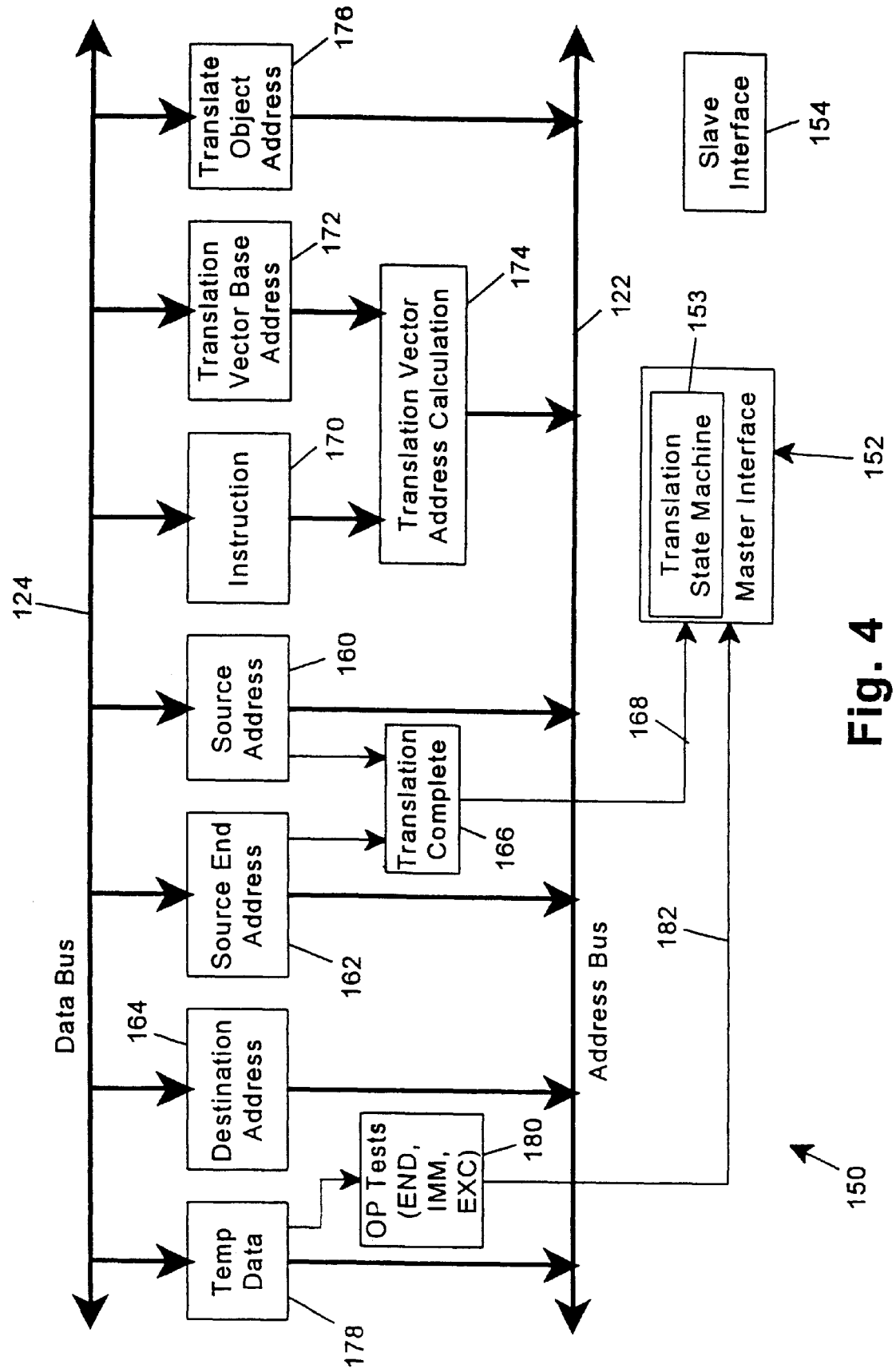
FIG. 4 is a functional block diagram of the translation circuit in the computer system of FIG. 3.

As shown in FIG. 4, translation circuit 150 requires several memory pointers which are stored in registers controlled via a translation state machine 153 in master interface 152. A source address register 160 points to the address of the platform-independent program code to be translated, and a destination address register 164 points to the address to which corresponding native instructions are to be stored by the circuit. The platform-independent instruction stored at the current address pointed to by register 170 is received over data bus 124 by instruction register 170.

Register 160 is initialized with the starting address of a block of program code to translate, and the register is incremented as instructions are translated by the translation circuit. A source end register 162 points to an ending address to be translated, and a translation complete comparator 166 receives both addresses from registers 160 and 162 and asserts a translation complete signal 168 when the current address in register 160 equals the ending address in register 162.

A translation vector base address register 172 stores the starting address of the first table, which is essentially a table of vectors pointing to the code translations. A translation vector address calculation block 174 receives the platform-independent instruction and the translation vector base address from blocks 170, 172 and outputs the address of a vector in the second table that points to the native code corresponding to the platform-independent instruction. In one embodiment, block 174 is implemented as a summer which adds together the values in registers 170, 172. Also, the value in register 170 is first shifted left two bits to convert the platform-independent code into a 32-bit offset value. Block 174 also includes in some embodiments a separate register to store the address pointing to the vector. In addition, a translate object address register 176 stores the vector stored at the address output from block 174, and is incremented as native code instructions are stored to the system memory starting at the destination address.

A temporary data register 178 receives native instructions over the data bus and is used as an input to an OP Tests block 180 that catches one or more reserved 32-bit codes to perform specialized functions. Block 180 outputs one or more reserved signals 182 to state machine 153 to indicate when a reserved code has been encountered.

The reserved codes are unused values that do not represent any valid native instructions. One reserved code is an END code that indicates the end of a sequence of native code to in effect delimit entries in the second table. Another reserved code is an IMM code that enables embedded immediate data in the platform-independent code to be passed through the translation circuit (as discussed below). An additional reserved code is an EXC code that indicates an exception condition to halt the translation process and interrupt the processor, thereby allowing the processor to interpret any functions that the translation circuit is not capable of translating. Other reserved codes may also be used.

The dataflow involved in the translation of a platform-independent instruction into a native instruction is illustrated in FIG. 5. Generally, source address register 160 points to a platform-independent instruction in a block of source platform-independent code 190 in memory 125. The platform-independent instruction is stored in instruction register 170, which is added to the contents of translation vector base address register 172, resulting in a pointer to a vector in translation vector table 192. The vector is stored in translate object address register 176, and is used to point to corresponding native code stored in translation object table 194. Native instructions in table 194 are stored in temporary data register 178, and subsequently into memory 125 at the address pointed to by destination address pointer 164 to form a block of output code 196.

In one specific embodiment, tables 192 and 194 are implemented in system RAM 126, thereby permitting processor 140 to alter the definitions of the translations if necessary. However, it should be appreciated that the tables may be permanently stored in ROM 128, or that separate volatile or non-volatile devices may be used in translation circuit 150 to implement either or both of tables 192 and 194 in the alternative.

In another specific embodiment, processor 140 initializes translation circuit 150 on start-up or prior to a translation. For example, during start-up, translation vector table 192 and translation object table 194 are initialized, e.g., by copying the tables from ROM 128 to RAM 126. In addition, translation vector base address register 172 in translation circuit 150 is initialized to the starting address of table 192. Initialization of register 172, as well as the other registers in translation circuit 150, is performed by processor 140 through slave interface 154.

Figure 6:
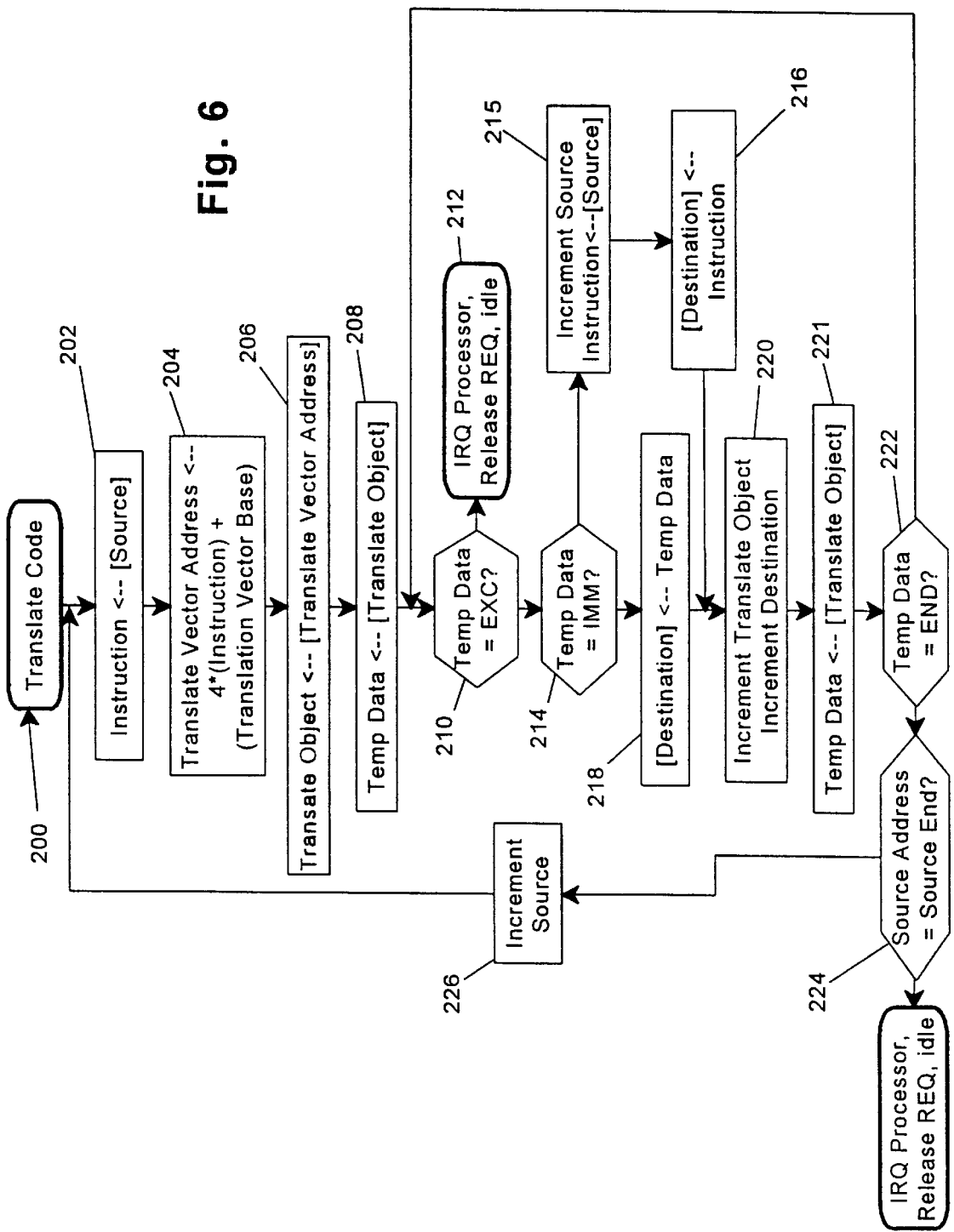
FIG. 6 is a flowchart illustrating the program flow of a Translate Code routine executed on the translation state machine of FIG. 4.

FIG. 6 illustrates an exemplary program flow of one specific embodiment, designated Translate Code routine 200, for translation state machine 153. Prior to executing routine 200, processor 140 initializes source address register 160 and source end address register 162 to point to the starting and ending addresses, respectively, of a block of platform-independent program code to be translated. Processor 140 also initializes destination address register 164 to point to the area to which the translated code is to be stored. Routine 200 is started in translation circuit 150 in response to the GRANT line being asserted by processor 140 (see FIG. 3), whereby control over bus 122, 124 is handed over to bus master 152.

First, in block 202 a platform-independent instruction (here a Java bytecode) is fetched from the memory location pointed to by source address register 160 and stored in instruction register 170. Next, in block 204 an index into table 192 is calculated by block 174 by summing the translation vector base address from register 172 with the contents of instruction register 170 shifted left two bits. Next, in block 206, the translate vector stored in table 192 at the address pointed to by the table index (Translate Vector Address) is stored in translate object address register 176. At this point, register 176 contains the starting address of the native code in table 194 corresponding to the platform-independent instruction being translated.

Next, in block 208, a 32-bit native instruction is retrieved from table 194 and stored in temporary data register 178. Two reserved 32-bit codes are then tested in blocks 210 and 214 by testing the state of lines 182 (FIG. 4). First assuming neither reserved code is encountered, control passes to block 218 to store the contents of temporary data register 178 at the memory location pointed to by destination address register 164.

Next, block 220 is executed to increment translate object address register 176 and destination address register 164.

Then, in block 221 the next 32-bit native instruction is retrieved from table 194 and stored in temporary data register 178. As long as the new instruction in temporary data register 178 is not an END reserved code, block 222 passes control to block 210 to process the new instruction.

If, however, the instruction is an END reserved code, block 222 passes control to block 224 to determine if the current source address stored in register 160 is equal to the source end address stored in register 162 by testing if translation complete signal 168 has been asserted by block 166. If the source address does not equal the source end address, additional platform-independent instructions must be processed, and control passes to block 226 to increment source address register 160. Then, control returns to block 202 to process the next platform-independent instruction.

If, however, the source address equals the source end address, translation is completed, whereby routine 200 terminates. The state machine notifies the processor that it is done by deasserting the REQ signal and passing an interrupt request to the processor. When done, the state machine enters an idle state.

Returning to block 210, translation state machine 153 handles exception conditions by testing for an EXC code. Upon receipt of this code, control is passed to block 212 where the translation process is halted, the REQ signal is released, and an interrupt is sent to processor 140. The exception condition is generally implemented when a platform-independent instruction cannot or will not be translated by translation circuit 150, thereby enabling processor 140 to interpret the instruction. An example of a Java bytecode that may generate an exception is the "ldcl" bytecode (12h), which pushes an item, which may have varying lengths (e.g., a string), onto the stack. The translation circuit shown herein does not include any mechanism to determine the length of an item, and consequently, processor 140 handles this instruction.

With respect to block 214, translation state machine 153 also tests for an IMM code, which indicates immediate data that is embedded in the program code. In response to this code, source register 160 is incremented and instruction register 170 is loaded with the contents of the memory location pointed to by source register 160 in block 215, and the contents of instruction register 170 are stored directly in memory location pointed to by destination address register 164 in block 216, before passing control to block 218. It should be appreciated that multiple IMM codes may be required, with separate processing, to handle immediate data of different lengths. For example, immediate transfers of 1 byte, 2 bytes, and full 32-bit words are possible, each of which would require a different number of bytes to be transferred by the state machine to block 196 in memory 125.

With the aforementioned translation circuit, platform-independent instructions may be translated into any number of native instruction streams. The native instruction streams may include a single native instruction, a sequence of native instructions, a single native instruction with embedded data, a sequence of native instructions with embedded data, an exception, an exception with embedded data, etc.

To further illustrate the operation of translation circuit 150, the translation of a sample sequence of Java bytecodes into corresponding ARM processor instructions will be described. It will be appreciated that the translation circuit shown herein only addresses translation of Java bytecodes into native instructions, and that other interpreter and loader functions are not addressed by the circuit. For example, in one specific embodiment, security rules are not checked or enforced, although such circuit functionality could be extended to check for generated addresses to handle the security functions as well.

Table I below illustrates a sample code fragment that adds a local variable to an integer stored on the stack, then subtracts a fixed value from the result:

TABLE I

Sample code fragment

| Code | Inst. | Comment |
|---|---|---|
|  |  | ;assume integer stored at top of stack |
| 1Ch | iload_2 | ;push local variable in current Java frame |
| 60h | iadd | ;add top two values on stack, push result |
| 06h | iconst_3 | ;push integer 3 onto stack |
| 64h | isub | ;subtract integer 3 from previous result |

To translate the code, certain assumptions as to the setup of the processor must be made. It will be assumed that R2 is a vars register which points to a set of local variables, R3 is an optop register that points to the operand stack, R4 is a frame register that points to an execution structure, R5 is a pointer to the processor's own pool of fixed constants, and R6 is allocated for temporary storage.

It is also assumed that the translation vector base address is 1000h, and that the start address for the translation object table is 8000h. One suitable translation vector table is shown partially in Table II below:

TABLE II

Translation Vector Table (Partial)

| Address | Contents | Comment |
|---|---|---|
| 1000h | 8000h | nop, bytecode 00h |
| 1004h | 8008h | aconst_null, bytecode 01h |
| 1008h | 8014h | inconst_ml, bytecode 02h |
| ... | ... | ... |
| ... | ... | ... |
| 1018h | 8044h | iconst_3, bytecode 06h |
| ... | ... | ... |
| ... | ... | ... |
| 1070h | 8188h | iload_2, bytecode 1Ch |
| ... | ... | ... |
| ... | ... | ... |
| 1180h | 8540h | iadd, bytecode 60h |
| ... | ... | ... |
| ... | ... | ... |
| 1190h | 8550h | isub, bytecode 64h |
| ... | ... | ... |
| ... | ... | ... |

A corresponding translation object table is shown partially below in Table III:

TABLE III

Translation Object Table (Partial)

| Address | Contents | Bytecode | ARM Code |
|---|---|---|---|
| 8000h | E1A06006h | 00h, null | MOV R6,R6 |
| 8004h | 00000000h (END) |  |  |
| 8008h | E3E06000h | 01h, aconst_null | MOV R6,#0 |
| 800Ch | E9230040h |  | STMFD R3!, {R6} |
| 8010h | 00000000h (END) |  |  |
| 8014h | E3E06001h | 02h, inconst_ml | MVN R6,#1 |
| 8018h | E9230040h |  | STMFD R3!, {R6} |
| 801Ch | 00000000h (END) |  |  |

TABLE III-continued

Translation Object Table (Partial)

| Address | Contents | Bytecode | ARM Code |
|---------|----------|----------|----------|
| ... | ... | ... | ... |
| ... | ... | ... | ... |
| 8044h | E3E06003h | 06h, iconst_3 | MOVR6,#3 |
| 8048h | E9230040h | | STMFD R3!, {R6} |
| 804Ch | 00000000h (END) | | |
| ... | ... | ... | ... |
| ... | ... | ... | ... |
| 8188h | E5926008h | 1Ch, iload_2 | LD R6,[R2,#8] |
| 818Ch | E9230040h | | STMFD R3!, {R6} |
| 8190h | 00000000h (END) | | |
| ... | ... | ... | ... |
| ... | ... | ... | ... |
| 8540h | E8B300C0h | 60h, iadd | LDMFD R3!, {R6,R7} |
| 8544h | E0876006h | | ADD R6,R7,R6 |
| 8548Ch | E9230040h | | STMFD R3!,{R6} |
| 854Ch | 00000000h (END) | | |
| ... | ... | ... | ... |
| ... | ... | ... | ... |
| 8550h | E8B300C0h | 64h, isub | LDMFD R3!, {R6,R7} |
| 8554h | E0476006h | | SUB R6,R7,R6 |
| 8558Ch | E9230040h | | STMFD R3!, {R6} |
| 855Ch | 00000000h (END) | | |
| ... | ... | ... | ... |
| ... | ... | ... | ... |

To translate the program code of Table I, processor 140 must pass starting and ending source addresses and destination addresses to registers 160, 162 and 164. For purposes of illustration, it is assumed that the program code of Table I is stored at 2000h–2003h, and that the corresponding native code will be stored starting at 3000h.

Following the program flow of routine 200 in FIG. 6, block 202 first executes to store the first bytecode in Table I (1 Ch at address 2000h) in instruction register 170. Next, the translation vector address is calculated in block 204 to be 1070h (4*1 Ch+1000h). Next, the vector stored at the translation vector address (8188h—see Table II) is retrieved in block 206 and stored in the translate object address register 176. Next, in block 208, the contents of the translation object table pointed to by register 176 (E592 6008h—see Table III) are loaded into temporary data register 178. The contents represent the first ARM (native) code corresponding to the Java bytecode to be translated.

Next, after blocks 210 and 214 do not detect a reserved code, block 218 stores the contents of the temporary data register 178 at the destination address (3000h). Next, block 220 increments translate object address register 176 (to 818Ch) and destination address register 164 (to 3004h).

Next, in block 221 temporary data register 178 is loaded with the next native instruction in translation object table 194 (E9230040h), then block 222 determines that the instruction is not the END code (00000000h) and returns control to block 210. Blocks 210 and 214 also do not detect a reserved code, so block 218 stores the instruction at the destination address (3004h). Block 220 then increments register 176 (to 8190h) and register 164 (to 3008h), and block 221 loads register 178 with the next native instruction (00000000h), the END reserved code.

Upon receipt of the END reserved code, block 222 passes control to block 224 to determine if the source address (currently 2000h) equals the source end address (2003h). Since it does not, block 226 increments the source address in register 160 (to 2001h) and returns control to block 202.

Processing of the remaining Java bytecodes proceeds in a similar manner until block 224 determines that the source address is equal to the source end address. At this point, the translation is complete. Table IV illustrates the resulting native program code stored at the destination address:

TABLE IV

Translated Sample Code

| Address | Contents | Description |
|---------|----------|-------------|
| 3000h | E5926008h | LD R6,[R2,#8] |
| 3004h | E9230040h | STMFD R3!,{R6} |
| 3008h | E8B300C0h | LDMFD R3!,{R6,R7} |
| 300Ch | E0876006h | ADD R6,R7,R6 |
| 3010h | E9230040h | STMFD R3!,{R6} |
| 3014h | E3E06003h | MOV R6,#3 |
| 3018h | E9230040h | STMFD R3!,{R6} |
| 301Ch | E8B300C0h | LDMFD R3!,{R6,R7} |
| 3020h | E0476006h | SUB R6,R7,R6 |
| 3024h | E9230040h | STMFD R3!,{R6} |

As discussed above, the translating means implemented in the various embodiments includes tables implemented in various volatile and non-volatile devices, including RAM's, ROM's, PLA's, as well as direct logic circuitry. Moreover, the translating means in some embodiments includes registers which access tables stored external to the translating circuit. Other modifications to the translating means may also be made consistent with the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer system for executing program code in a format having platform-independent instructions, the computer system comprising:

a processor for executing program code in a format having native instructions;

a memory coupled to the processor for storing program code for execution by the processor, wherein the memory is a first memory and is coupled to the processor by an address bus and a data bus;

a vector table and an object table, the object table including a plurality of entries, each entry including at least one native instruction corresponding to one of the platform-independent instructions, and the vector table including a plurality of vectors indexed by the platform-independent instructions, each vector pointing to one of the entries in the object table; and a translation circuit coupled to the memory, the translation circuit configured and arranged to receive a platform-independent instruction from the memory and output at least one native instruction for the processor corresponding thereto, wherein the translation circuit further comprises:

a state machine, coupled to the memory and the vector and object tables, the state machine configured and arranged to receive a block of platform-independent program code stored in the memory and output a block of corresponding native program code to the memory;

a source address register configured and arranged to store a source address in the memory of a platform-independent instruction to be translated;

a destination address register configured and arranged to store a destination address in the memory at which to store a native instruction corresponding to the platform-independent instruction pointed to by the source address register;

an instruction register configured and arranged to store the platform-independent instruction pointed to by the source address register; and a translate object address register configured and arranged to store a translate object address pointing to a native instruction stored in the object table that corresponds to the platform-independent instruction pointed to by the source address register;

wherein the state machine is coupled to the source address register, the destination address register, the instruction register, and the translate object address register, and wherein the state machine is configured and arranged to manipulate the destination address and translate object address registers to store each native instruction, in the entry in the object table corresponding to the platform-independent instruction stored in the instruction register, in the memory starting at the destination address.

2. The computer system of claim 1, wherein entries in the object table include end codes delimiting the end of the entries, and wherein the state machine is configured and arranged to detect the end codes to terminate translation of each platform-independent instruction.

3. The computer system of claim 2, wherein selected entries in the object table further include immediate codes indicating embedded data in the block of platform-independent program code, and wherein the state machine is configured and arranged to detect the immediate codes to store embedded data directly in the corresponding block of native program code.

4. The computer system of claim 1, wherein the platform-independent instruction comprises a Java-type bytecode.

5. The computer system of claim 1, wherein the translation circuit outputs an exception signal to the processor when a platform-independent instruction received by the translation circuit cannot be directly translated to a native instruction.

6. The computer system of claim 1, wherein the vector and object tables are stored in the memory.

7. The computer system of claim 1, wherein the processor and the translation circuit are disposed on the same integrated circuit chip.

8. A translation circuit for use in a computer system to execute program code in a format having platform-independent instructions on a processor in the computer system that executes program code in a format having native instructions, the computer system further including a memory, the translation circuit comprising:

an input circuit configured and arranged to receive a platform-independent instruction, the input circuit including a source address register configured and arranged to store a source address of a platform-independent instruction to be translated;

translating means, coupled to the input circuit, for outputting at least one native instruction for the processor corresponding the platform-independent instruction;

a destination address register configured and arranged to store a destination address in the memory for storing a native instruction corresponding to the platform-independent instruction pointed to by the source address register; and a block processing means, coupled to the source address register, the destination address register, and the translating means, and configured and arranged to supply a block of platform-independent program code stored in the memory to the translating means and store in the memory a block of corresponding native program code output from the translating means.

9. The translation circuit of claim 8, wherein the input circuit includes an instruction register configured and arranged to store the platform-independent instruction, and wherein the translating means includes a translate object address register storing a vector to an entry in an object table in the memory, the entry including at least one native instruction corresponding to the platform-independent instruction.

10. The translation circuit of claim 9, wherein the translating means further comprises a translation vector base address register configured and arranged to store a starting address for a vector table in the memory, the vector table including a plurality of vectors, each of which points to an entry in the object table, and the vector table indexed by the platform-independent instruction stored in the instruction register.

11. The translation circuit of claim 8, wherein the translating means comprises an object table including a plurality of entries, each entry matching a platform-independent instruction with at least one native instruction for the processor.

12. The translation circuit of claim 11, wherein the translating means further comprises a vector table, indexed by the platform-independent instruction received by the receiving means, the vector table including a plurality of vectors, each of which points to an entry in the object table.

13. The translation circuit of claim 8, wherein the translation circuit is disposed in a single integrated circuit device.

14. The translation circuit of claim 13, wherein the translation circuit is disposed on the same integrated circuit device as the processor of the computer system.

15. The translation circuit of claim 8, wherein the translation circuit is disposed on a circuit board.

16. The translation circuit of claim 15, wherein the translation circuit is disposed on the same circuit board as the processor and the memory of the computer system.

17. The translation circuit of claim 8, wherein the block processing means includes a state machine, the state machine acting as a bus master that controls the bus during translation of the block of platform-independent program code.

18. The translation circuit of claim 8, wherein the platform-independent instruction is a Java bytecode.

19. A computer system for executing program code in a format having platform-independent instructions, the computer system comprising:

a processor for executing program code in a format having native instructions;

a memory coupled to the processor for storing program code for execution by the processor;

a translation circuit coupled to the memory, the translation circuit configured and arranged to receive a platform-independent instruction from the memory and output at least one native instruction for the processor corresponding thereto;

a source address register configured and arranged to store a source address in the memory of a platform-independent instruction to be translated;

a destination address register configured and arranged to store a destination address in the memory for storing a native instruction corresponding to the platform-independent instruction pointed to by the source address register; and a state machine, coupled to the memory, the source address register, the destination address register, and the translation circuit, the state machine configured and arranged to supply a block of platform-independent program code stored in the memory to the translation circuit and store in the memory a block of corresponding native program code output from the translation circuit.

20. The computer system of claim 19, further comprising a vector table and an object table, the object table including a plurality of entries, each entry including at least one native instruction corresponding to one of the platform-independent instructions, and the vector table including a plurality of vectors indexed by the platform-independent instructions, each vector pointing to one of the entries in the object table.

21. The computer system of claim 20, wherein entries in the object table include end codes delimiting the end of the entries, and wherein the state machine is configured and arranged to detect the end codes to terminate translation of each platform-independent instruction.

22. The computer system of claim 21, wherein selected entries in the object table further include immediate codes indicating embedded data in the block of platform-independent program code, and wherein the state machine is configured and arranged to detect the immediate codes to store embedded data directly in the corresponding block of native program code.

23. The computer system of claim 21, wherein the processor and the translation circuit are disposed on the same integrated circuit chip.

24. The computer system of claim 20, wherein the vector and object tables are stored in the memory.

25. The computer system of claim 19, wherein the platform-independent instruction comprises a Java-type bytecode.

26. The computer system of claim 19, wherein the translation circuit outputs an exception signal to the processor when a platform-independent instruction received by the translation circuit cannot be directly translated to a native instruction.

27. A method of executing program code in a format having platform-independent instructions on a processor which executes program code in a format having native instructions, the method comprising:

receiving a platform-independent instruction, including receiving a block of platform-independent program code;

storing a source address of a platform independent instruction from the block of platform-independent program code in a source address register;

translating the block of platform independent program code with a hardware-implemented translation circuit into a block of corresponding native program code including at least one corresponding native instruction using an object table including a plurality of entries, each entry matching a platform-independent instruction with at least one native instruction for the processor; and storing the block of corresponding native program code in the memory starting at a destination address stored in a destination address register.

28. The method of claim 27, wherein translating the platform-independent instruction includes using the platform-independent instruction as an index to a vector table coupled to the object table, the vector table including a plurality of vectors, each of which points to an entry in the object table.

29. The method of claim 27, wherein the platform-independent instruction is a Java bytecode.

* * * * *